Feb. 9, 1926.  
N. MacINNES  
1,572,024  
VEHICLE LAMP  
Filed June 28, 1922   2 Sheets-Sheet 2

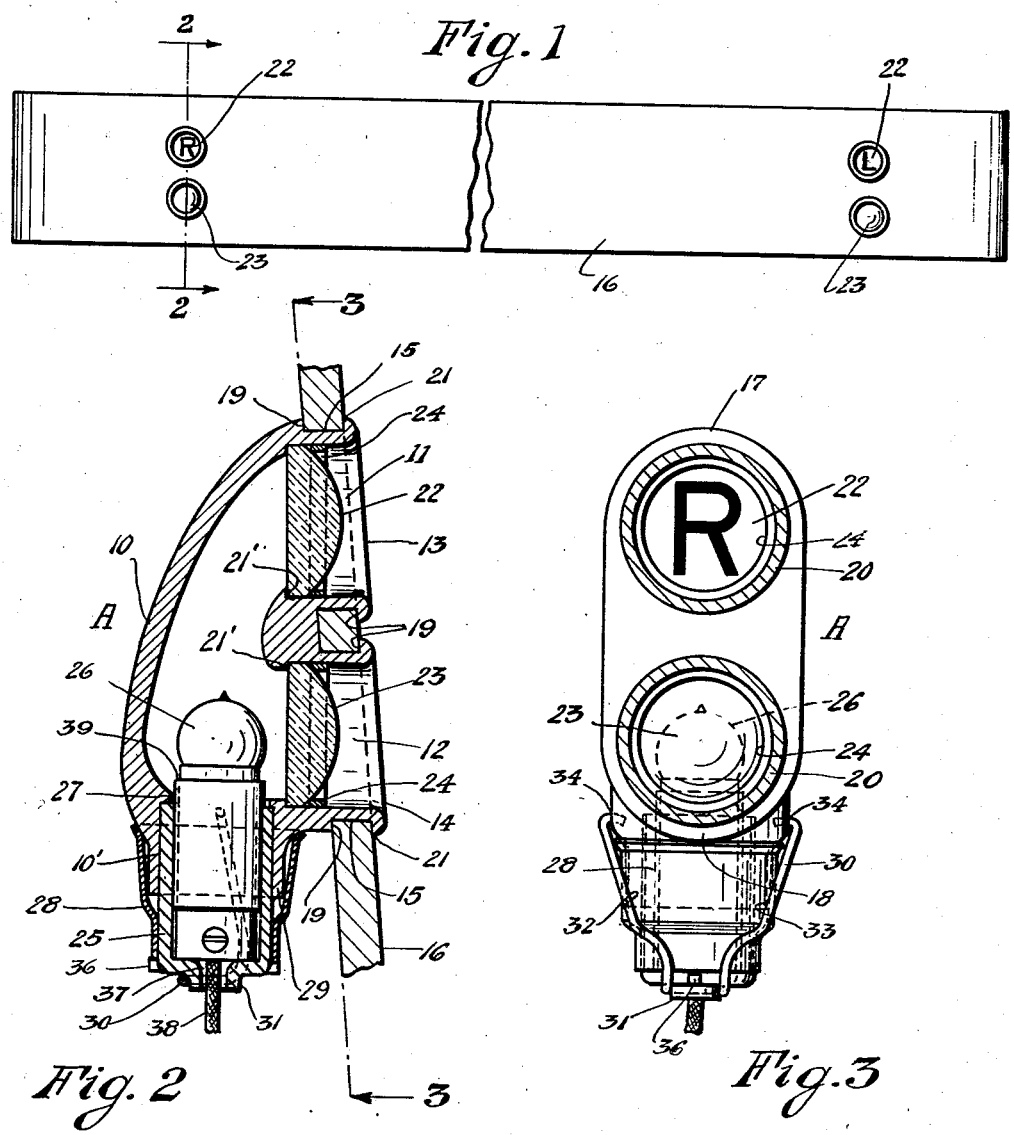

Witnesses:  
Wm. Schnellhardt  
C. E. Mead

Inventor:  
Neil MacInnes  
By Joshua R. H. Potts  
His Attorney

Patented Feb. 9, 1926.

1,572,024

UNITED STATES PATENT OFFICE.

NEIL MacINNES, OF CHICAGO, ILLINOIS.

VEHICLE LAMP.

Application filed June 28, 1922. Serial No. 571,386.

*To all whom it may concern:*

Be it known that I, NEIL MACINNES, a citizen of the United States, and a resident of the city of Chicago, county of Cook, and State of Illinois, have invented certain new and useful Improvements in Vehicle Lamps, of which the following is a specification.

My invention relates to new and useful improvements in vehicle lamps and especially relates to the class of lamps especially designed to serve as a signal lamp and trouble lamp and has for its principal object the provision of an improved construction of this character which will be highly efficient in use and economical in manufacture.

A further object of the invention is the provision of a lamp of this character which upon being demounted can be utilized as a trouble light.

A further contemplation of the invention is the selection means or manner of attaching my improved vehicle lamp in operating position which in this instance, the lamp is carried by the safety bumper of the vehicle.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of the vehicle bumper showing oppositely disposed lamps associated therewith, embodying the invention;

Fig. 2 is a vertical sectional detail view of the same taken substantially on line 2—2 of Fig. 1;

Fig. 3 is a vertical sectional view of the same taken substantially on line 3—3 of Fig. 2;

Figure 4:
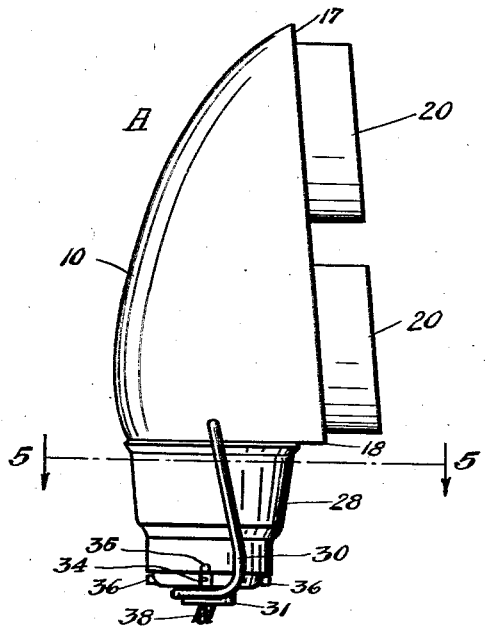
Fig. 4 is a side elevational view of the lamp embodying the invention.

In carrying my inventions into effect, I provide a lamp A consisting of a hollow casing 10, of suitable material, open at its bottom end as at 10' and provided with windows 11 and 12. The windows 11 and 12 are each surrounded by annular projection 13 and 14, each adapted to pass through an opening 15, formed in a vehicle bumper 16, of any improved type. The inner side of the bumper 16, is adapted to abut against shoulders 17 and 18 of the lamp A as indicated at 19. The lamp A is fixedly secured to the bumper 16, by turning or working over the extreme outer edges 20 of each of the projections 13 and 14 as clearly illustrated in Fig. 2 at 21. This construction is such that theft of the lamp is prevented inasmuch as the only way to detach the lamp from the bumper 16 is by filing away the turned edges 20. This construction also constitutes a simple means for attaching the lamp in position.

Surrounding the inner portion of each of the windows 11 and 12 is a seat 21' against which each of the window closures 22 and 23 rest, said window closures being of any desired color and of comparatively heavy glass. The window closure members 22 and 23 are each held in position by a retaining ring member 24 which is frictionally held in position.

The purpose of the opening 10' of the casing 10 is for the reception of an electric bulb support 25 which carries the electric bulb 26, there being an annular shoulder 27 formed at the inner end of the opening 10' against which the support 25 is adapted to engage. Surrounding the support 25 is a dust cap 28 which embraces a reduced portion 29, of the casing 10, as clearly illustrated in Fig. 2.

The support 25 and dust-cap 28 are held in the position shown in Fig. 2 by a retaining member 30 a portion of which passes around a lateral boss 31, carried by the support 25 and then projects upwardly along the sides of the dust-cap as illustrated in Fig. 3 and indicated at 32. The opposite ends of the retaining member 30 are bent inwardly and adapted to engage openings 34 formed in the adjacent sides of the casing 10.

In mounting the dust-cap 28 on the support 25, I prefer to provide grooves 34 in the opposite corresponding sides of the support into which suitable pins 35 are carried by the dust-cap 28 are adapted to engage. This construction permits the dust-cap to be moved longitudinally with respect to the support 25. To prevent the dust-cap from becoming detached from the support 25, I provide at the lower end of the support lateral projections 36 on which the dust cap is adapted to rest when in the position illustrated in Fig. 2, said projections 36 also serve to limit the movement of the dust cap in a direction toward the lower end of the support. The illustration in Fig. 6 shows the support 25 detached from the casing 10 and the dust-cap moved to its extreme former position in which position it serves as a reflector, and the device as shown in Fig. 6, illustrates its position when used as a trouble light.

Formed in the bottom wall of the support 25, as illustrated in Fig. 2 is a central opening 37 for the passage of a circuit wire 38 as connected to the electric bulb socket 39.

It is also my object, as herein stated, to utilize my improved lamp as a signal light to indicate the direction the vehicle, on which the light is mounted, is to turn. And when the lamp is used as such, I print or paint the letter "R" or "L" on the upper window member 22, designating right or left respectively.

Figure 6:
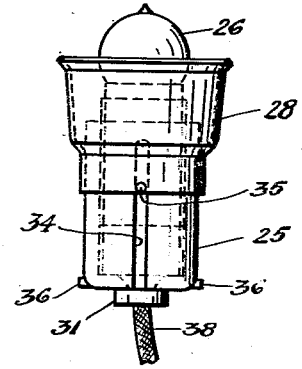
Fig. 6 is the elevational view of the bulb support detached from the lamp proper showing the same as it appears when used as a trouble light.
Figure 5:
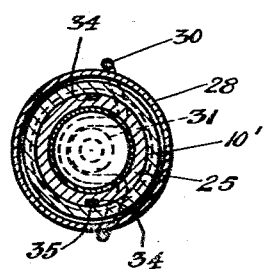
Fig. 5 is a horizontal detail view taken substantially on line 5—5 of Fig. 4.
Figure 7:
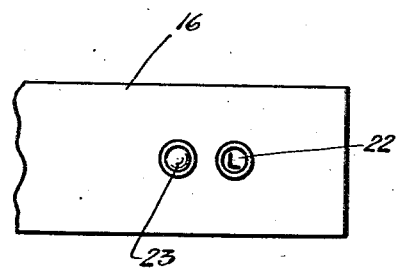
Fig. 7 is a fragmentary view of the bumper showing the lamp embodying the invention associated therewith, but in a different arrangement than that illustrated in Fig. 1.

In addition to this, the construction is such that the bulb support can be detached from the lamp proper and utilized as a trouble lamp as shown in Fig. 6.

While I have illustrated and described the preferred form of construction for carrying my invention into effect, this is capable of variation and modification without departing from the spirit of the invention. I, therefore, do not wish to be limited to the precise details of the construction set forth; but desire to avail myself of such variations and modifications as come within the scope of the appended claims.

Having described my invention, what I claim as new and desire to secure by Letters Patent is:

1. A vehicle lamp, the combination with a vehicle bumper having adjacent openings formed therein, of a casing having adjacent openings formed therein, transparent closure members for the openings of the casing, illuminating means arranged in the casing, and annular projections surrounding the openings of the casing and taken through the openings of the bumper and provided with peripheral edges turned away from the openings of the bumper against the adjacent side surface thereof.

2. A vehicle lamp, the combination with a vehicle bumper having adjacent openings formed therein, of a casing open at its lower end and having adjacent openings formed therein, projections surrounding the openings of the casing and taken through the openings of the bumper and provided with peripheral edges turned away from the openings of the bumper against the adjacent side surface thereof, a lighting element, a support carrying the lighting element and carried by the casing with a portion passing into said lower opening.

3. A vehicle lamp, the combination with a vehicle bumper having adjacent openings formed therein, of a casing opened at its lower end and having adjacent windows formed therein, projections surrounding said windows and taken through the openings of the bumper and provided with peripheral edges turned away from the openings of the bumper against the adjacent side surface thereof, a lighting element, a support for said lighting element having a portion passing into the opening at the lower end of the casing, and means for removably securing the support to the casing.

4. A vehicle lamp including a casing open at its lower end and having adjacent windows formed therein, means for securing the casing to a bumper bar of a vehicle, a lighting element support having a portion passing into the opening at the lower end of the casing, and means for removably securing the support to the casing.

5. A vehicle lamp including in combination with a bumper bar of a vehicle, a casing associated with said bumper and having windows formed in the walls thereof, means surrounding the windows and passing through the openings formed in the bumper bar and having portions turned away from the windows to secure the casing to the bumper bar, and a lighting element within the casing.

6. A vehicle lamp including in combination with a bumper bar of a vehicle, a casing having an opening in the lower end thereof and windows formed in the wall thereof, a lighting element support having a portion passing through the opening at the lower end of the casing, and means surrounding the windows and passing through openings formed in the bumper bar and having portions turned away from the windows against the adjacent side of the bumper bar.

7. A vehicle lamp including in combination with a bumper bar of a vehicle, a casing having adjacent openings formed therein provided with shoulders, transparent closure members for the openings abutting the shoulders, means for holding the closure members against the shoulders, means on the casing and passing through openings formed in the bumper bar and having portions turned against the adjacent side of the bumper bar for securing the casing thereto, and a lighting element within the casing.

8. A combination vehicle lamp and trouble light, comprising in combination with the bumper of a vehicle, of a lamp casing carried by said vehicle; an electric element support detachably carried by said casing; a dust-cap carried by said support and engaging the lower end of said casing; said dust-cap adapted to be moved forwardly with respect to said support when said support is detached from said casing; grooves formed in the opposite corresponding sides of said supports; and guide pins carried by said dust-cap and engaging said grooves.

9. A lamp of the class described including an electric element support, of grooves formed in opposite corresponding sides of said support; a reflector mounted to move longitudinally with respect to said support; and guide members carried by said reflector and engaging said grooves.

10. A lamp of the class described including an electric element support, of grooves formed in opposite corresponding sides of said support; a reflector mounted to move longitudinally with respect to said support, and guide members carried by said reflector and engaging said grooves; and means carried by said support to prevent detachment of said reflector therefrom.

11. In combination with a support having an opening therein, a lamp casing provided with a window, a projecting portion surrounding the window and passing through the opening of the support, a removable support carried by the casing, and a lighting element carried by the last named support.

12. In combination with a support having an opening therein, a lamp casing provided with a window, a projecting portion surrounding the window and passing through the opening and having its edges turned away from the opening against the adjacent sides of the support, and a lighting element within the casing.

13. In combination with a support having an opening therein, a lamp casing provided with a window, means surrounding the window and passing through the opening and having a portion turned away from the opening against the adjacent side of the support, a support having a portion passing into an opening formed in the lower end of the casing, and a lighting element carried by the support.

In testimony whereof I have signed my name to this specification.

NEIL MacINNES.